US007845013B2

(12) United States Patent
Bhogal et al.

(10) Patent No.: US 7,845,013 B2
(45) Date of Patent: Nov. 30, 2010

(54) METHOD AND SYSTEM FOR PROTECTING THE SECURITY OF AN OPEN FILE IN A COMPUTING ENVIRONMENT

(75) Inventors: Kulvir Singh Bhogal, Fort Worth, TX (US); Gregory Jensen Boss, American Fork, UT (US); Rick Allen Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 11/442,910

(22) Filed: May 30, 2006

(65) Prior Publication Data
US 2007/0282854 A1 Dec. 6, 2007

(51) Int. Cl.
*G06F 17/00* (2006.01)
(52) U.S. Cl. ...................................................... 726/27
(58) Field of Classification Search .................. 726/26, 726/27
See application file for complete search history.

(56) References Cited

U.S. PATENT DOCUMENTS

| | | | |
|---|---|---|---|
| 5,475,839 | A | 12/1995 | Watson et al. |
| 6,137,480 | A | 10/2000 | Shintani |
| 6,401,209 | B1 | 6/2002 | Klein |
| 6,889,233 | B2 * | 5/2005 | Lin et al. ..................... 707/200 |
| 7,350,204 | B2 * | 3/2008 | Lambert et al. ............. 717/172 |
| 2002/0002468 | A1 * | 1/2002 | Spagna et al. .................. 705/1 |
| 2003/0216136 | A1 | 11/2003 | McBrearty et al. |
| 2004/0046638 | A1 | 3/2004 | Kawasaki |

FOREIGN PATENT DOCUMENTS

JP 63-289668 11/1998

OTHER PUBLICATIONS

Lettieri, et al.; Personal Computer Security Device; TDB 07-87; pp. 725-726.

* cited by examiner

*Primary Examiner*—Kimyen Vu
*Assistant Examiner*—John B King
(74) *Attorney, Agent, or Firm*—Schmeiser, Olsen & Wattts; William E. Schiesser (57) ABSTRACT

A file security protection method and system. The method is performed by an operating system of a computer system. A metadata token is received from a software application executing on the computer system. The metadata token denotes that the application has opened a file. The metadata token includes the name of the file. An initial time is set to about a time at which the metadata token was received. A loop is executed. Each iteration of the loop includes determining whether a first or second condition has been satisfied. The loop is exited if it is determined that the first or second condition has been satisfied. The first condition is that an elapsed time relative the initial time exceeds a specified threshold. The second condition is that a closeout token denoting that the file has been closed has been received from the application.

40 Claims, 4 Drawing Sheets

METHOD AND SYSTEM FOR PROTECTING THE SECURITY OF AN OPEN FILE IN A COMPUTING ENVIRONMENT

FIELD OF THE INVENTION

The present invention discloses a method and system for protecting the security of an open file in a computing environment.

BACKGROUND OF THE INVENTION

Many different software applications have within them the ability to mark files as "private," "sensitive," "protected," or otherwise make such files hidden from unintended viewing. Examples of such implementations range from the ubiquitous password protection given to Microsoft Word documents, through the gamut of other analogous password-protected graphical and spreadsheet files, down to the complete masking of protected files (e.g., with Palm OS Memo functionality). A security gap exists however, as despite the password protections provided by the relevant applications, human error or casualness about his/her environment may offer unplanned eyes the opportunity to view such files.

Current means of protecting documents, as implied, assume that the file user will save and close the sensitive document rather than permit the document to be inadvertently viewed by others. However, in practice, this dependence upon human consistency falls short as users walk away from their computers, attend to phone calls and other such interruptions, or in the case of handheld devices, "smart phones," and personal digital assistants (i.e., highly portable devices) forget to re-mask records for conceivably days at a time. When the user walks away from the computer, the opportunity arises for others to view the screen contents. When a user forgets to re-mask records on a highly portable device, its sensitive contents may be viewed by anyone who finds the device. In any of these cases, secrecy is compromised. Whether the information is of a business or personal nature, human inattentiveness has revealed information previously deemed to be of a confidential nature.

Thus, there is a need for a capability to enhancing file security in a computing environment.

SUMMARY OF THE INVENTION

The present invention provides a file security protection method, said method comprising:

receiving a metadata token from a software application executing on a computer system, said metadata token denoting that the application has opened a file having a name, said metadata token comprising the name of the file;

responsive to receiving the metadata token, setting an initial time to about a time at which said receiving the metadata token occurred; and after setting the initial time, executing iterations of a loop, each iteration of said iterations comprising determining whether a first condition has been satisfied, determining whether a second condition has been satisfied, and exiting the loop in response to having determined that the first condition or the second condition has been satisfied, wherein the first condition is that an elapsed time relative the initial time exceeds a specified threshold, wherein the second condition is that a closeout token denoting that the file has been closed has been received from the application such that the closeout token comprises the name of the file, and wherein said receiving the metadata, said setting the initial time, and said executing the iterations of the loop are performed by an operating system executing on the computer system.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a file security protection method, said method comprising:

receiving a metadata token from a software application executing on a computer system, said metadata token denoting that the application has opened a file having a name, said metadata token comprising the name of the file;

responsive to receiving the metadata token, setting an initial time to about a time at which said receiving the metadata token occurred; and after setting the initial time, executing iterations of a loop, each iteration of said iterations comprising determining whether a first condition has been satisfied, determining whether a second condition has been satisfied, and exiting the loop in response to having determined that the first condition or the second condition has been satisfied, wherein the first condition is that an elapsed time relative the initial time exceeds a specified threshold, wherein the second condition is that a closeout token denoting that the file has been closed has been received from the application such that the closeout token comprises the name of the file, and wherein said receiving the metadata, said setting the initial time, and said executing the iterations of the loop are performed by an operating system executing on the computer system.

The present invention provides a computer program product, comprising a computer usable medium having a computer readable program code embodied therein, said computer readable program code containing instructions that when executed by a processor of a computer system implement a file security protection method, said method comprising:

receiving a metadata token from a software application executing on a computer system, said metadata token denoting that the application has opened a file having a name, said metadata token comprising the name of the file;

responsive to receiving the metadata token, setting an initial time to about a time at which said receiving the metadata token occurred; and after setting the initial time, executing iterations of a loop, each iteration of said iterations comprising determining whether a first condition has been satisfied, determining whether a second condition has been satisfied, and exiting the loop in response to having determined that the first condition or the second condition has been satisfied, wherein the first condition is that an elapsed time relative the initial time exceeds a specified threshold, wherein the second condition is that a closeout token denoting that the file has been closed has been received from the application such that the closeout token comprises the name of the file, and wherein said receiving the metadata, said setting the initial time, and said executing the iterations of the loop are performed by an operating system executing on the computer system.

The present invention provides a computer system comprising a processor and a computer readable memory unit coupled to the processor, said memory unit containing instructions that when executed by the processor implement a file security protection method, said method comprising:

receiving a metadata token from a software application executing on a computer system, said metadata token denoting that the application has opened a file having a name, said metadata token comprising the name of the file;

responsive to receiving the metadata token, setting an initial time to about a time at which said receiving the metadata token occurred; and after setting the initial time, executing iterations of a loop, each iteration of said iterations comprising determining whether a first condition has been satisfied, determining whether a second condition has been satisfied, and exiting the loop in response to having determined that the first condition or the second condition has been satisfied, wherein the first condition is that an elapsed time relative the initial time exceeds a specified threshold, wherein the second condition is that a closeout token denoting that the file has been closed has been received from the application such that the closeout token comprises the name of the file, and wherein said receiving the metadata, said setting the initial time, and said executing the iterations of the loop are performed by an operating system executing on the computer system.

The present invention advantageously enhances file security in a computing environment

DETAILED DESCRIPTION OF THE INVENTION

Figure 1:
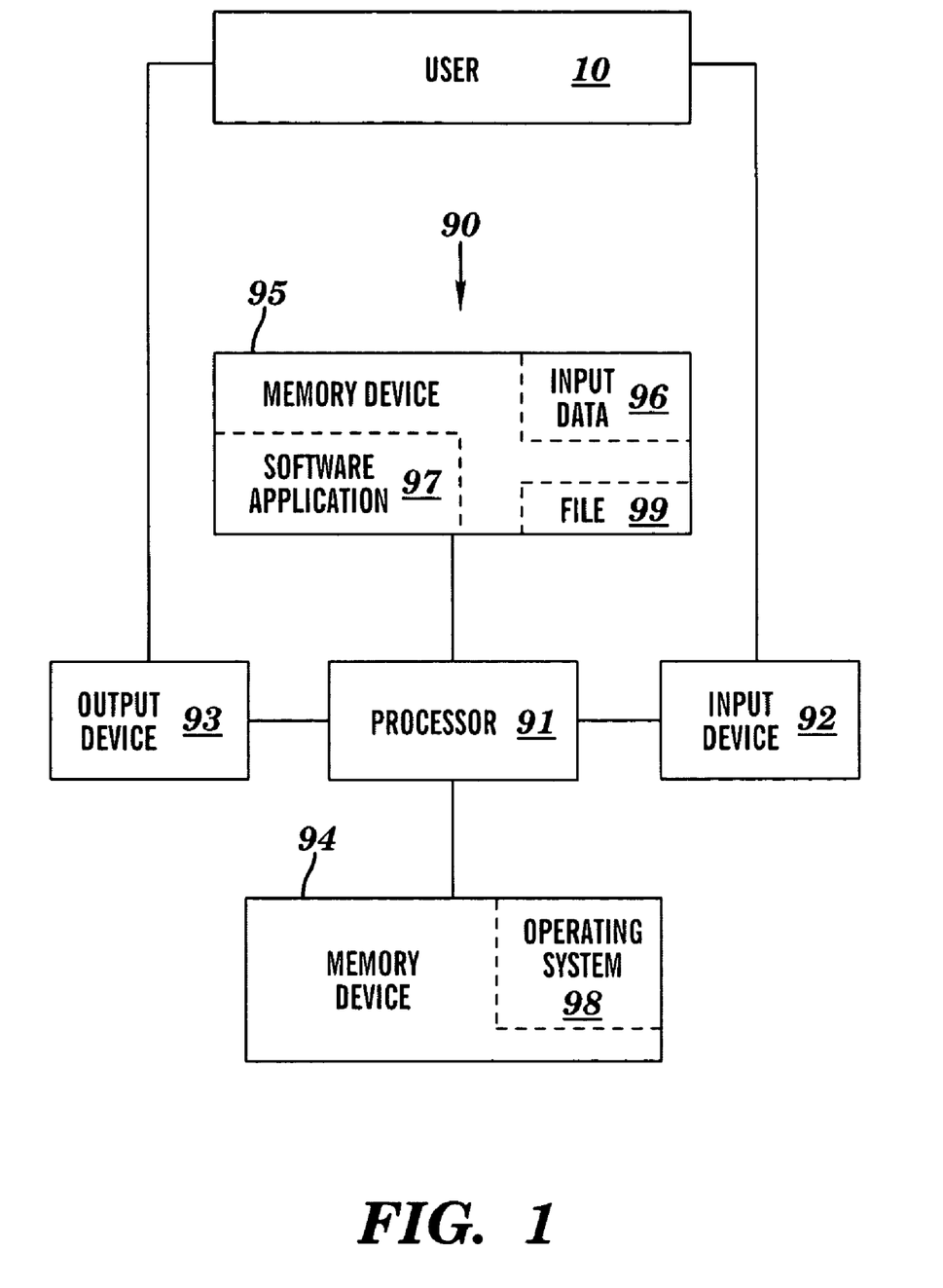
FIG. 1 illustrates a computer system, comprising a software application and an operating system, used for implementing a method that protects the security of an open file, in accordance with embodiments of the present invention.

FIG. 1 illustrates a computer system 90 used for implementing a method that protects the security of an open file (e.g., an open document), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be a computer readable storage medium or computer readable memory device such as, inter alia, a hard disk, a floppy disk, a magnetic tape, an optical storage such as a compact disc (CD) or a digital video disc (DVD), a dynamic random access memory (DRAM), a read-only memory (ROM), etc. The memory device 94 includes an operating system 98 for the computer system 90. The operating system 98 comprises a set of programs that manages the basic hardware resources (e.g., disks, memory, keyboard, screen, CPU time, etc.) and software resources (e.g., computer programs such as software applications) of the computer system 90. Examples of operating systems in current or past use include UNIX, DOS, XENIX, Linux, OS2/WARP, Windows, IBMs VM and VS/VME, etc.

The memory device 95 includes a software application 97, input data 96, and a file 99. The software application 97 is a computer program that comprises computer-executable instructions and utilizes the file 99. The input data 96 includes input required by the software application 97. The operating system 98 includes software for implementing a method that protects the security of the file 99 after the file 99 has been opened by the software application 97. A user 10 is a user of the software application 97. The user 10 has access to the file 99, the input device 92, and the output device 93.

The processor 91 is one or more processors. The processor 91 executes the software application 97 and the operating system 98 runs on the processor 91. The output device 93 displays output from the software application 97 and/or any other data (e.g., the input data 96). Either or both memory devices 94 and 95 (or one or more additional memory devices not shown FIG. 1) may be used as a computer readable storage medium or program storage device for storing data and program code therein (e.g., having a computer readable program stored therein and/or having other data stored therein), wherein the computer readable program comprises the software application 97. Generally, a computer program product (or, alternatively, an article of manufacture) of the computer system 90 may comprise said computer usable medium (or said program storage device).

Any of the components of the present invention could be deployed, managed, serviced, etc. by a service provider who offers to deploy or integrate computing infrastructure with respect to an operating system that is enhanced by the file security protection method of the present invention. Thus the present invention discloses a process for supporting computer infrastructure, comprising integrating, hosting, maintaining, and deploying computer-readable code into the computer system 90, wherein the code in combination with the computer system 90 is capable of performing a method for protecting the security of an open file.

In another embodiment, the invention provides a business method that performs the process steps of the invention on a subscription, advertising, and/or fee basis. That is, a service provider, such as a Solution Integrator, could offer to create, maintain, support, etc. an operating system that is enhanced by the file security protection method of the present invention. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 1 shows the computer system 90 as a particular configuration of hardware and software, any configuration of hardware and software, as would be known to a person of ordinary skill in the art, may be utilized for the purposes stated supra in conjunction with the particular computer system 90 of FIG. 1. For example, the memory devices 94 and 95 may be portions of a single memory device rather than separate memory devices. As another example, the software application 97 and the operating system 98 could be stored on either a same memory device or different memory devices.

The present invention discloses a method and system for protecting the security of an open file (e.g., file 99) in a computing environment. The present invention enhances file security by enabling application calls or connections to the operating system 98, so that the operating system 98 may change certain default behaviors during the time that a file containing sensitive or private records has been opened. The present invention provides for an application programming interface (API) call or other such invocation between the application and the operating system 98. The content of this call/invocation informs the operating system 98 that a sensitive file has been opened, and that the operating system 98 should take certain actions accordingly.

Figure 2:
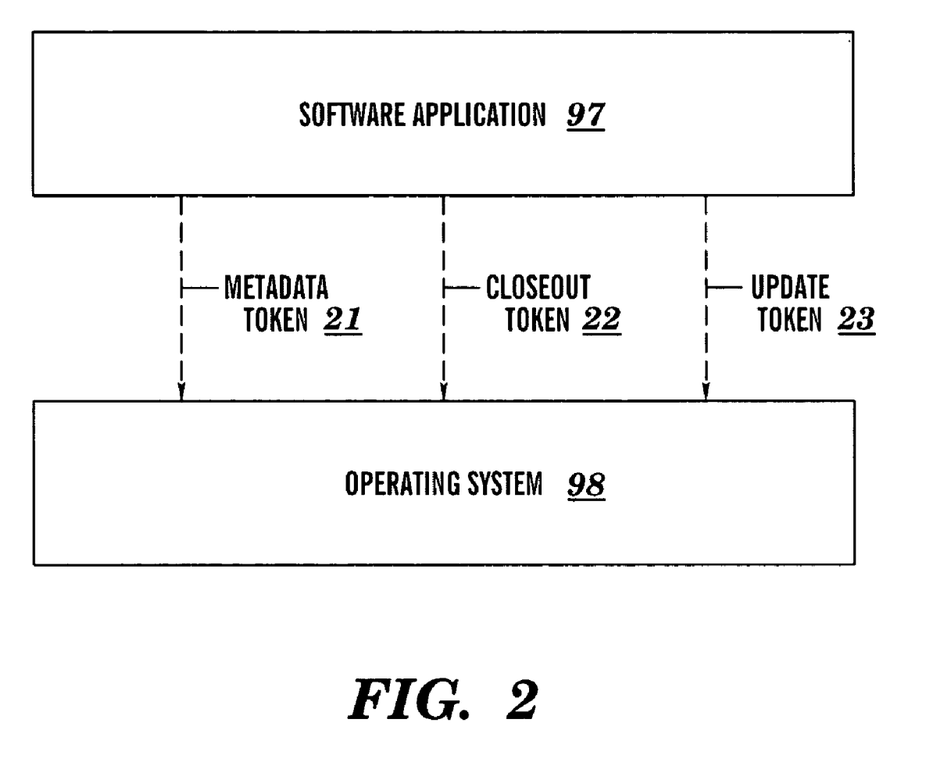
FIG. 2 is a block diagram depicting a flow of tokens from the software application to the operating system of FIG. 1, in accordance with first embodiments of the present invention.

FIG. 2 is a block diagram depicting flow of metadata token 21, closeout token 22, and update token 23 from the software application 97 to the operating system 98 of FIG. 1, in accordance with first embodiments of the present invention. A "token" is defined herein as structured data comprising information, one or more pointers to information (e.g., a pointer to a memory address, a device address, a website address, etc, that comprises the information), or a combination thereof. The token may be structured as a message or as a data structure in any suitable format (e.g., a file, a database table, etc.) for being transmitted from one node to another node within a computing system. A node may be a physical node (e.g., a physical address) or a virtual node (e.g., a software interface such as an entry point to program code). The timing for deployment, the usage, and the functionality of the metadata token 21, the closeout token 22, and the update token 23 will be described infra in conjunction with FIGS. 3 and 4.

Figure 3:
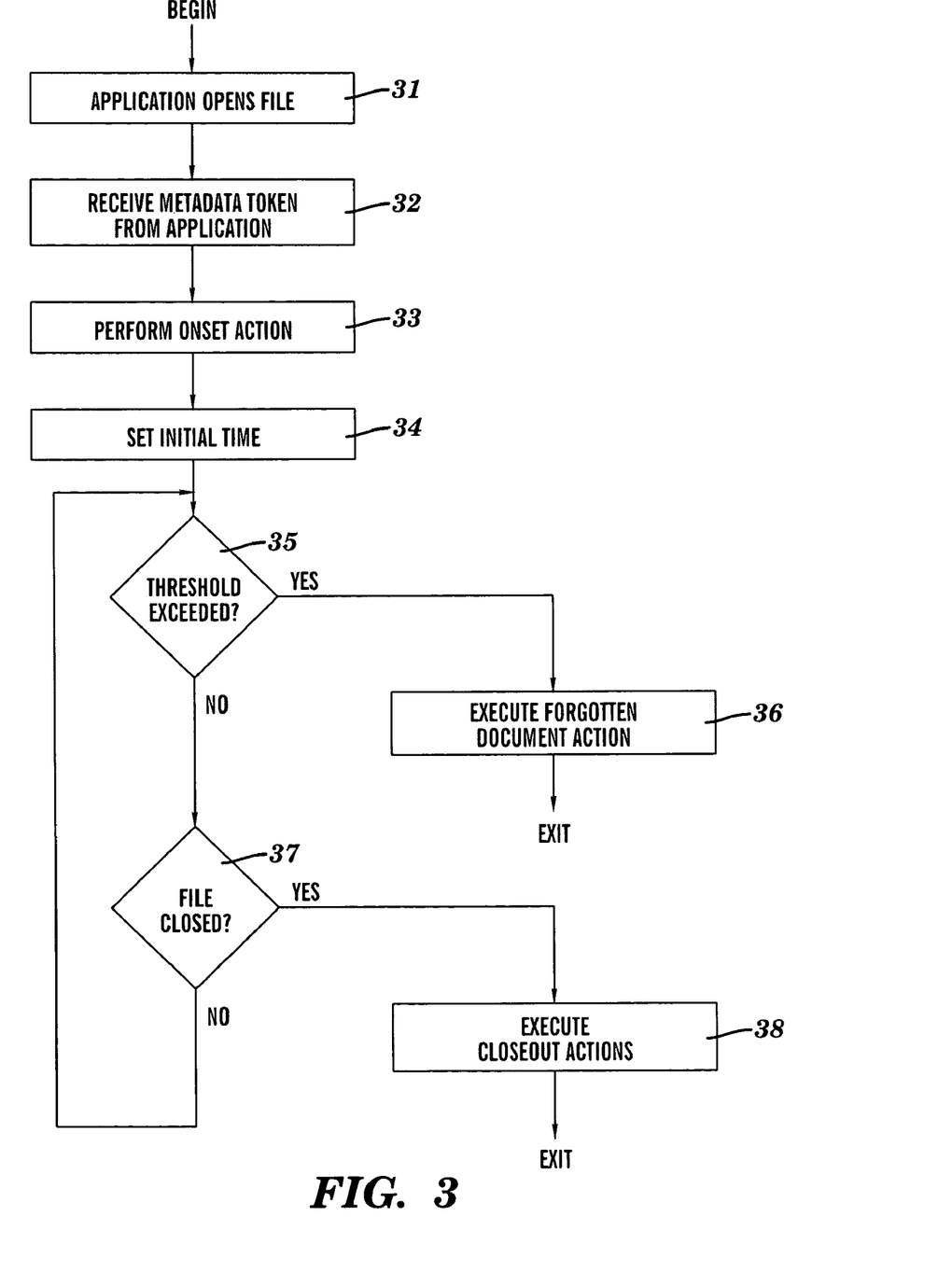
FIG. 3 is a flow chart depicting a method for protecting the security of an open file with respect to the computer system of FIG. 1, in accordance with first embodiments of the present invention.

FIG. 3 is a flow chart depicting a method, comprising steps 31-38 of an algorithm, for protecting the security of an open file with respect to the computer system 90 of FIG. 1, in accordance with first embodiments of the present invention.

In step 31, the software application 97 opens the file 99. The file 99 may have been assigned a security level with respect to a security classification system and may accordingly be in need of security protection. The security level may be expressed numerically (e.g., 1, 2, 3, 4, . . . ) or textually (e.g., "sensitive", "confidential", "secret", etc.). Even if the file 99 has not been assigned a security level, the file 99 may nonetheless contain sensitive material and thus be in need of security protection. The sensitive nature of the file 99 may be deemed by use of a password or other masking mechanism.

In step 32, the operating system 98 receives a metadata token 21 from the application 97. The metadata token denotes that the application has opened the file 99. The metadata token 21 comprises the name of the file 99. The metadata token 21 may further comprise at least one of: an identification of the application 97, a specified threshold ($T_{TH}$) against which "time elapsed" is measured (as described infra in conjunction with step 35), and the level of security that has been assigned to the file 99 (if applicable).

In one embodiment, the metadata token 21 comprises a security level of the file but not the threshold. Instead, the operating system 98 determines the threshold by using the security level in the metadata token 21 in conjunction with a specification of threshold as a function of security level. For example, the operating system 98 may utilize a table such as Table 1.

TABLE 1

| Security Level | Threshold (minutes) |
|---|---|
| 1 | 10 |
| 2 | 15 |
| 3 | 25 |

In step 33, responsive to receiving the metadata token 21, the operating system 98 may perform an onset action. Performing the onset action may comprise modifying a screen saver/screen-lock time-out value, triggering a visual indicator on a screen or hardware of the user 10 to remind the user of that file 99 is open, or combinations thereof. The screen or hardware may be comprised by the output device 93. The visual indicator may be, inter alia, an attention-provoking icon or message (e.g., * Your File "STRATEGIC_BUYOUT" is Open *" in red color).

In step 34, responsive to receiving the metadata token 21, the operating system 98 sets an initial time ($T_0$) to about a time at which the metadata token 21 was received by the operating system 98 from the software application 97. For example, the operating system 98 may determine the initial time from a system clock of the computer system 90. The initial time serves as a reference against which subsequent elapsed time ($\Delta T$) is measured, wherein the elapsed time is indicative of how much time elapsed since the initial time was set. Note that the elapsed time $\Delta T$ is $T-T_0$, wherein T is the dynamically changing current time which may be determined by, inter alia, invoking a timer function at the operating system level. The elapsed time $\Delta T$ may be viewed as a "staleness indicator" indicative of how long it has been since interaction with the file has occurred.

In step 35, the operating system 98 determines whether the elapsed time exceeds the threshold; i.e., whether $\Delta T > T_{TH}$. If it is determined in step 35 that the elapsed time exceeds the threshold, then "forgotten document" actions are executed in step 36 followed by exiting execution of the algorithm of FIG. 3; otherwise step 37 is next executed.

In step 36, the executed forgotten document actions may be at least one of: masking an application window on a screen (output device 93) of the user 10; auto-saving and closing the file 99; and sending a remote indicator (e.g., email/page/SMS/IM) to a contact device of an owner of the file 99 to indicate that the file 99 remains open.

In step 37, the operating system 98 determines whether the file 99 has been closed. The application 97 communicates that the file 99 has been closed by sending a closeout token 22 (see FIG. 2) to the operating system 98. The closeout token 22 comprises the name of the file 99. Thus, the operating system 98 implements step 37 by determining whether the operating system 98 has received the closeout token 22 from the application 97. If it is determined in step 37 that the file 99 has been closed (i.e., the closeout token 22 has been received by the operating system 98), then closeout actions are executed in step 38 followed by exiting execution of the algorithm of FIG. 3; otherwise the algorithm loops back to step 35 to perform the next iteration of the loop of steps 35 and 37.

In step 38, the executed closeout actions may be at least one of: modifying a screen saver/screen-lock time-out value; and turning off a visual indicator on a screen (output device 93) of the user 10.

The looping through steps 35 and 37 is repeated iteratively until one of the aforementioned condition for executing step 36 or step 38 is satisfied.

Figure 4:
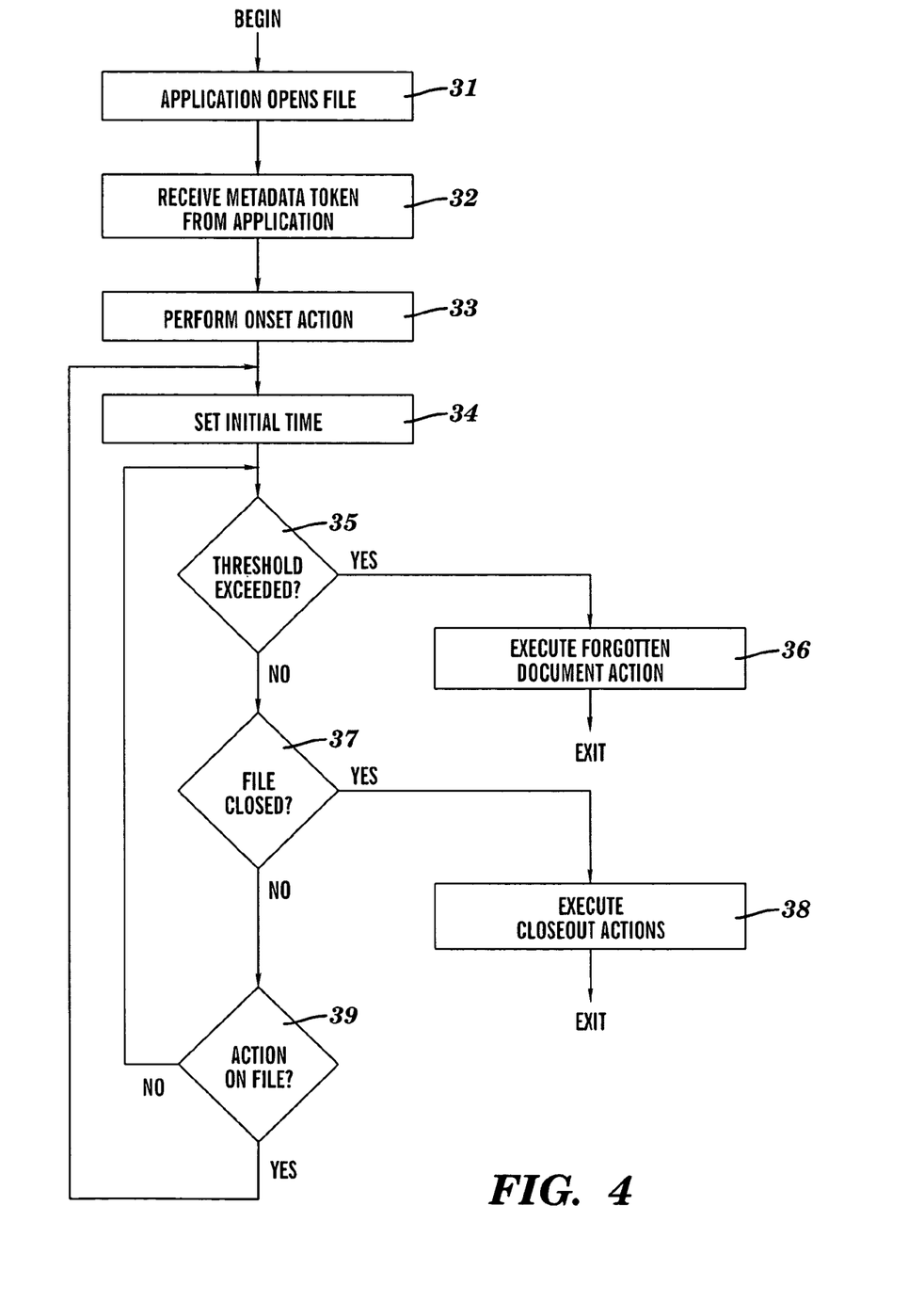
FIG. 4 is a flow chart depicting a method for protecting the security of an open file with respect to the computer system of FIG. 1, in accordance with second embodiments of the present invention.

FIG. 4 is a flow chart depicting a method, comprising steps 31-39 of an algorithm, for protecting the security of an open file with respect to the computer system of FIG. 1, in accordance with second embodiments of the present invention. Steps 31-38 of FIG. 4 are the same steps as steps 31-38 in FIG. 3. Steps 31-38 have been described supra in conjunction with FIG. 3. Thus, the description infra of FIG. 4 focuses on step 39, which is not included in FIG. 3.

If it is determined in step 37 that the file 99 has been closed, then closeout actions are executed in step 38 (as described supra) followed by exiting execution of the algorithm of FIG. 3; otherwise step 39 is next executed.

In step 39, the operating system 98 determines whether an action on the file 99 has been undertaken. The application 97 communicates that an action on the file 99 has been undertaken, by sending an update token 23 (see FIG. 2) to the operating system 98. The update token 23 comprises the name of the file 99. Thus, the operating system 98 implements step 39 by determining whether the operating system 98 has received the update token 23 from the application 97. If it is determined in step 39 that an action on the file 99 has not been undertaken (i.e., the update token 23 has not been received by the operating system 98), then the algorithm loops back to step 35 to perform the next iteration of the inner loop of steps 35, 37, and 39; otherwise the the algorithm loops back to step 35 to reset the initial time to the current time (e.g., as determined from the system clock) to perform the next iteration of the outer loop of steps 34, 35, 37, and 39.

The update token 23 may be passed to the operating system 98 each time (or via a defined interval) the file 99 is changed. In this event, the operating system 98 is tracking time between file changes, to indicate a potentially forgotten file. Note that the update token 23 may be passed in implementation-specific options: via an explicit action in which the file 99 is changed (saved or unsaved) through deletion of content from the file 99, addition of new content to the file 99, and/or change of content of the file 99; or via an action in which the file 99 is unchanged and a non-intrusive action has occurred with respect to the file (e.g., page down/page up, scrolling, etc.) Either of these actions (explicit action or non-intrusive action) indicates that the user 99 is still actively engaged with the application 97 and the file 99 itself.

The inner looping through steps 35, 37, and 39 is repeated iteratively until one of the aforementioned condition for executing step 36 or step 38 is satisfied. The outer looping through steps 34, 35, 37, and 39 is repeated iteratively until an action on the file 99 has been undertaken as determined in step 39.

Note that if multiple sensitive files were open simultaneously, the algorithms of FIGS. 3 and 4 would extrapolate without complication. The onset and closeout actions changing operating system 98 behavior would correspond to the first sensitive file opened and the last sensitive file closed, and chronologically-based actions would be unique to each application and/or file as described supra.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A file security protection method, said method comprising:

a processor of a computer system receiving a metadata token from a software application executing on the computer system, said metadata token denoting that the application has opened a file having a name, said metadata token comprising the name of the file;

responsive to receiving the metadata token, said processor setting an initial time to a time at which said receiving the metadata token occurred; and after setting the initial time, said processor executing iterations of a loop, each iteration of said iterations comprising determining whether a first condition has been satisfied, determining whether a second condition has been satisfied, and exiting the loop in response to having determined that the first condition or the second condition has been satisfied, wherein the first condition is that an elapsed time relative the initial time exceeds a specified threshold, and wherein the second condition is that a closeout token denoting that the file has been closed has been received from the application such that the closeout token comprises the name of the file.

2. The method of claim 1, wherein the metadata token further comprises an identification of the application.

3. The method of claim 1, wherein the metadata token further comprises the specified threshold.

4. The method of claim 1, wherein the metadata token further comprises a security level of the file, and wherein the method further comprises said processor selecting the specified threshold using the security level in the metadata token in conjunction with a specification of threshold as a function of security level.

5. The method of claim 1, wherein the method further comprises during an iteration of said iterations:

receiving an update token from the application, wherein the update token denotes that an action has been performed with respect to the file, and wherein the update token comprises the name of the file; and responsive to said receiving the update token, resetting the initial time to a time at which said receiving the update token occurred.

6. The method of claim 5, wherein the action is an action in which the file is changed.

7. The method of claim 5, wherein the action is an action in which the file is unchanged and a non-intrusive action has occurred with respect to the file.

8. The method of claim 1, wherein the method further comprises:

responsive to receiving the metadata token, said processor performing an onset action, wherein said performing the onset action is selected from the group consisting of modifying a screen saver/screen-lock time-out value, triggering a visual indicator on a screen of a user of said application, and combinations thereof.

9. The method of claim 1, wherein the method further comprises:

responsive to having determined that the first condition has been satisfied, said processor performing a forgotten document action, wherein said performing the forgotten document action is selected from the group consisting of masking an application window on a screen of a user of the application, auto-saving and closing the file, sending a remote indicator to a contact device of an owner of the file to indicate that the file remains open, and combinations thereof.

10. The method of claim 1, wherein the method further comprises:

responsive to having determined that the second condition has been satisfied, said processor performing a closeout action selected from the group consisting of modifying a screen saver/screen-lock time-out value, turning off a visual indicator on a screen of a user of the application, and combinations thereof.

11. A process for supporting computer infrastructure, said process comprising:

providing at least one support service for at least one of creating, integrating, hosting, maintaining, and deploying computer-readable code in a computer system, wherein the code in combination with the computer system is capable of performing a file security protection method, said method comprising:

a processor of the computer system receiving a metadata token from a software application executing on the computer system, said metadata token denoting that the application has opened a file having a name, said metadata token comprising the name of the file;

responsive to receiving the metadata token, said processor setting an initial time to a time at which said receiving the metadata token occurred; and after setting the initial time, said processor executing iterations of a loop, each iteration of said iterations comprising determining whether a first condition has been satisfied, determining whether a second condition has been satisfied, and exiting the loop in response to having determined that the first condition or the second condition has been satisfied, wherein the first condition is that an elapsed time relative the initial time exceeds a specified threshold, and wherein the second condition is that a closeout token denoting that the file has been closed has been received from the application such that the closeout token comprises the name of the file.

12. The process of claim 11, wherein the metadata token further comprises an identification of the application.

13. The process of claim 11, wherein the metadata token further comprises the specified threshold.

14. The process of claim 11, wherein the metadata token further comprises a security level of the file, and wherein the method further comprises said processor selecting the specified threshold using the security level in the metadata token in conjunction with a specification of threshold as a function of security level.

15. The process of claim 11, wherein the method further comprises during an iteration of said iterations:

receiving an update token from the application, wherein the update token denotes that an action has been performed with respect to the file, and wherein the update token comprises the name of the file; and responsive to said receiving the update token, resetting the initial time to a time at which said receiving the update token occurred.

16. The process of claim 15, wherein the action is an action in which the file is changed.

17. The process of claim 15, wherein the action is an action in which the file is unchanged and a non-intrusive action has occurred with respect to the file.

18. The process of claim 11, wherein the method further comprises:

responsive to receiving the metadata token, said processor performing an onset action, wherein said performing the onset action is selected from the group consisting of modifying a screen saver/screen-lock time-out value, triggering a visual indicator on a screen of a user of said application, and combinations thereof.

19. The process of claim 11, wherein the method further comprises:

responsive to having determined that the first condition has been satisfied, said processor performing a forgotten document action, wherein said performing the forgotten document action is selected from the group consisting of masking an application window on a screen of a user of the application, auto-saving and closing the file, sending a remote indicator to a contact device of an owner of the file to indicate that the file remains open, and combinations thereof.

20. The process of claim 11, wherein the method further comprises:

responsive to having determined that the second condition has been satisfied, said processor performing a closeout action selected from the group consisting of modifying a screen saver/screen-lock time-out value, turning off a visual indicator on a screen of a user of the application, and combinations thereof.

21. A computer program product, comprising a non-transitory computer readable storage medium having a computer readable program code stored therein, said computer readable program code containing instructions that when executed by a processor of a computer system implement a file security protection method, said method comprising:

receiving a metadata token from a software application executing on the computer system, said metadata token denoting that the application has opened a file having a name, said metadata token comprising the name of the file;

responsive to receiving the metadata token, setting an initial time to a time at which said receiving the metadata token occurred; and after setting the initial time, executing iterations of a loop, each iteration of said iterations comprising determining whether a first condition has been satisfied, determining whether a second condition has been satisfied, and exiting the loop in response to having determined that the first condition or the second condition has been satisfied, wherein the first condition is that an elapsed time relative the initial time exceeds a specified threshold, and wherein the second condition is that a closeout token denoting that the file has been closed has been received from the application such that the closeout token comprises the name of the file.

22. The computer program product of claim 21, wherein the metadata token further comprises an identification of the application.

23. The computer program product of claim 21, wherein the metadata token further comprises the specified threshold.

24. The computer program product of claim 21, wherein the metadata token further comprises a security level of the file, and wherein the method further comprises selecting the specified threshold using the security level in the metadata token in conjunction with a specification of threshold as a function of security level.

25. The computer program product of claim 21, wherein the method further comprises during an iteration of said iterations:

receiving an update token from the application, wherein the update token denotes that an action has been performed with respect to the file, and wherein the update token comprises the name of the file; and responsive to said receiving the update token, resetting the initial time to a time at which said receiving the update token occurred.

26. The computer program product of claim 25, wherein the action is an action in which the file is changed.

27. The computer program product of claim 25, wherein the action is an action in which the file is unchanged and a non-intrusive action has occurred with respect to the file.

28. The computer program product of claim 21, wherein the method further comprises:

responsive to receiving the metadata token, said processor performing an onset action, wherein said performing the onset action is selected from the group consisting of modifying a screen saver/screen-lock time-out value, triggering a visual indicator on a screen of a user of said application, and combinations thereof.

29. The computer program product of claim 21, wherein the method further comprises:
   responsive to having determined that the first condition has been satisfied, performing a forgotten document action, wherein said performing the forgotten document action is selected from the group consisting of masking an application window on a screen of a user of the application, auto-saving and closing the file, sending a remote indicator to a contact device of an owner of the file to indicate that the file remains open, and combinations thereof.

30. The computer program product of claim 21, wherein the method further comprises:
   responsive to having determined that the second condition has been satisfied, performing a closeout action selected from the group consisting of modifying a screen saver/screen-lock time-out value, turning off a visual indicator on a screen of a user of the application, and combinations thereof.

31. A computer system comprising a processor and a computer readable memory device coupled to the processor, said memory device containing instructions that when executed by the processor implement a file security protection method, said method comprising:
   receiving a metadata token from a software application executing on the computer system, said metadata token denoting that the application has opened a file having a name, said metadata token comprising the name of the file;
   responsive to receiving the metadata token, setting an initial time to a time at which said receiving the metadata token occurred; and
   after setting the initial time, executing iterations of a loop, each iteration of said iterations comprising determining whether a first condition has been satisfied, determining whether a second condition has been satisfied, and exiting the loop in response to having determined that the first condition or the second condition has been satisfied,
   wherein the first condition is that an elapsed time relative the initial time exceeds a specified threshold, and
   wherein the second condition is that a closeout token denoting that the file has been closed has been received from the application such that the closeout token comprises the name of the file.

32. The computer system of claim 31, wherein the metadata token further comprises an identification of the application.

33. The computer system of claim 31, wherein the metadata token further comprises the specified threshold.

34. The computer system of claim 31, wherein the metadata token further comprises a security level of the file, and wherein the method further comprises selecting the specified threshold using the security level in the metadata token in conjunction with a specification of threshold as a function of security level.

35. The computer system of claim 31, wherein the method further comprises during an iteration of said iterations:
   receiving an update token from the application, wherein the update token denotes that an action has been performed with respect to the file, and wherein the update token comprises the name of the file; and
   responsive to said receiving the update token, resetting the initial time to a time at which said receiving the update token occurred.

36. The computer system of claim 35, wherein the action is an action in which the file is changed.

37. The computer system of claim 35, wherein the action is an action in which the file is unchanged and a non-intrusive action has occurred with respect to the file.

38. The computer system of claim 31, wherein the method further comprises:
   responsive to receiving the metadata token, said processor performing an onset action, wherein said performing the onset action is selected from the group consisting of modifying a screen saver/screen-lock time-out value, triggering a visual indicator on a screen of a user of said application, and combinations thereof.

39. The computer system of claim 31, wherein the method further comprises:
   responsive to having determined that the first condition has been satisfied, performing a forgotten document action, wherein said performing the forgotten document action is selected from the group consisting of masking an application window on a screen of a user of the application, auto-saving and closing the file, sending a remote indicator to a contact device of an owner of the file to indicate that the file remains open, and combinations thereof.

40. The computer system of claim 31, wherein the method further comprises:
   responsive to having determined that the second condition has been satisfied, performing a closeout action selected from the group consisting of modifying a screen saver/screen-lock time-out value, turning off a visual indicator on a screen of a user of the application, and combinations thereof.

* * * * *